＝
US010042821B1

(12) United States Patent
Cronin et al.

(10) Patent No.: US 10,042,821 B1
(45) Date of Patent: Aug. 7, 2018

(54) SOCIAL NETWORK SYSTEM

(71) Applicant: ProSports Technologies, LLC, Miami, FL (US)

(72) Inventors: John E. Cronin, Bonita Springs, FL (US); Richard Fields, Miami, FL (US)

(73) Assignee: PROSPORTS TECHNOLOGIES, LLC, Miami, FL (US)

( * ) Notice: Subject to any disclaimer, the term of this patent is extended or adjusted under 35 U.S.C. 154(b) by 0 days.

(21) Appl. No.: 15/078,778

(22) Filed: Mar. 23, 2016

Related U.S. Application Data

(63) Continuation of application No. 14/788,754, filed on Jun. 30, 2015, now Pat. No. 9,343,066.

(60) Provisional application No. 62/023,355, filed on Jul. 11, 2014.

(51) Int. Cl.
*G10L 21/00* (2013.01)
*G06F 17/22* (2006.01)
*G10L 25/72* (2013.01)
*G06F 17/24* (2006.01)

(52) U.S. Cl.
CPC ............. *G06F 17/22* (2013.01); *G06F 17/24* (2013.01); *G10L 25/72* (2013.01)

(58) Field of Classification Search
CPC ....... G10L 15/265; G10L 15/22; G10L 15/26; G10L 13/00; G10L 2015/228; G06F 17/30864; H04L 12/1822; G06Q 30/0201
USPC ... 704/1–10, 243–250, 255, 257, 270, 270.1
See application file for complete search history.

(56) References Cited

U.S. PATENT DOCUMENTS

| | | | |
|---|---|---|---|
| 6,253,179 B1 * | 6/2001 | Beigi | G10L 17/04 704/243 |
| 6,487,534 B1 | 11/2002 | Thelen et al. | |
| 6,622,084 B2 | 9/2003 | Cardno et al. | |
| 6,633,852 B1 | 10/2003 | Heckerman et al. | |
| 6,980,966 B1 | 12/2005 | Sobrado et al. | |
| 7,082,427 B1 | 7/2006 | Seibel et al. | |
| 7,715,723 B2 | 5/2010 | Kagawa et al. | |
| 7,800,646 B2 | 9/2010 | Martin | |
| 7,818,176 B2 | 10/2010 | Freeman et al. | |
| 7,881,702 B2 | 2/2011 | Heyworth et al. | |
| 7,970,608 B2 | 6/2011 | Madhavapeddi et al. | |

(Continued)

FOREIGN PATENT DOCUMENTS

| | | |
|---|---|---|
| CN | 102843186 | 12/2012 |
| EP | 1 096 715 | 8/2006 |

(Continued)

OTHER PUBLICATIONS

US 9,679,565, 06/2017, Cronin (withdrawn)

(Continued)

*Primary Examiner* — Huyen Vo
(74) *Attorney, Agent, or Firm* — Polsinelli LLP

(57) ABSTRACT

The present invention includes systems and methods for sending social media messages without the need for keyboard inputs. A microphone captures live audio speech data and transmits the audio data to a processing unit. The processing unit converts the audio to speech data. The processing unit also removes censored words, emphasizes key words, and edits that data to include product and promotional messages where appropriate. The processing unit then uses code words contained in the speech data to send the speech data to the appropriate social media outlets for output.

18 Claims, 4 Drawing Sheets

(56) References Cited

U.S. PATENT DOCUMENTS

| | | | |
|---|---|---|---|
| 8,090,707 B1 | 1/2012 | Orrtung et al. |
| 8,183,997 B1 | 5/2012 | Wong et al. |
| 8,253,586 B1 | 8/2012 | Matak |
| 8,254,535 B1 | 8/2012 | Madhavapeddi et al. |
| 8,265,612 B2 | 9/2012 | Athsani et al. |
| 8,290,925 B1 | 10/2012 | Anandan et al. |
| 8,355,912 B1 | 1/2013 | Keesey et al. |
| 8,472,988 B2 | 6/2013 | Metcalf et al. |
| 8,502,717 B2 | 8/2013 | Lin et al. |
| 8,502,718 B2 | 8/2013 | Chiu et al. |
| 8,543,404 B2 | 9/2013 | Moore et al. |
| 8,560,323 B2 | 10/2013 | Madhavapeddi et al. |
| 8,577,685 B2 | 11/2013 | Morrison |
| 8,589,667 B2 | 11/2013 | Mujtaba et al. |
| 8,611,930 B2 | 12/2013 | Louboutin et al. |
| 8,620,344 B2 | 12/2013 | Huang et al. |
| 8,626,465 B2 | 1/2014 | Moore et al. |
| 8,630,216 B2 | 1/2014 | Deivasigamani et al. |
| 8,660,501 B2 | 2/2014 | Sanguinetti |
| 8,665,118 B1 | 3/2014 | Woodard et al. |
| 8,696,113 B2 | 4/2014 | Lewis |
| 8,706,044 B2 | 4/2014 | Chang et al. |
| 8,724,723 B2 | 5/2014 | Panicker et al. |
| 8,750,207 B2 | 6/2014 | Jeong et al. |
| 8,793,094 B2 | 7/2014 | Tam et al. |
| 8,816,868 B2 | 8/2014 | Tan et al. |
| 8,831,529 B2 | 9/2014 | Toh et al. |
| 8,831,655 B2 | 9/2014 | Burchill et al. |
| 8,836,851 B2 | 9/2014 | Brunner |
| 8,843,158 B2 | 9/2014 | Nagaraj |
| 8,849,308 B2 | 9/2014 | Marti et al. |
| 8,862,060 B2 | 10/2014 | Mayor |
| 8,873,418 B2 | 10/2014 | Robinson et al. |
| 8,874,090 B2 | 10/2014 | Abuan et al. |
| 8,917,632 B2 | 12/2014 | Zhou et al. |
| 8,934,921 B2 | 1/2015 | Marti et al. |
| 9,343,066 B1 | 5/2016 | Cronin |
| 9,384,734 B1* | 7/2016 | Wiseman ............... G10L 15/26 |
| 9,711,146 B1 | 7/2017 | Cronin |
| 2002/0099574 A1 | 7/2002 | Cahill et al. |
| 2004/0117528 A1 | 6/2004 | Beacher et al. |
| 2005/0160270 A1 | 7/2005 | Goldberg et al. |
| 2005/0207596 A1 | 9/2005 | Beretta et al. |
| 2006/0025214 A1 | 2/2006 | Smith |
| 2006/0095329 A1 | 5/2006 | Kim |
| 2007/0032945 A1 | 2/2007 | Kaufman |
| 2007/0136128 A1 | 6/2007 | Janacek et al. |
| 2007/0282621 A1 | 12/2007 | Altman et al. |
| 2007/0290888 A1 | 12/2007 | Reif et al. |
| 2008/0114633 A1 | 5/2008 | Wolf et al. |
| 2008/0134282 A1 | 6/2008 | Fridman et al. |
| 2008/0317263 A1 | 12/2008 | Villarreal |
| 2009/0005040 A1 | 1/2009 | Bourne |
| 2009/0198778 A1* | 8/2009 | Priebe ............... H04L 12/1822 709/206 |
| 2010/0057743 A1 | 3/2010 | Pierce |
| 2010/0070312 A1 | 3/2010 | Hunt |
| 2010/0086107 A1 | 4/2010 | Tzruya |
| 2010/0201362 A1 | 8/2010 | Crossan |
| 2010/0208082 A1 | 8/2010 | Buchner et al. |
| 2011/0029894 A1 | 2/2011 | Eckstein |
| 2011/0035220 A1* | 2/2011 | Opaluch ............... G10L 15/265 704/246 |
| 2011/0211524 A1 | 9/2011 | Holmes et al. |
| 2011/0282860 A1 | 11/2011 | Baarman et al. |
| 2012/0022875 A1 | 1/2012 | Cross et al. |
| 2012/0023390 A1* | 1/2012 | Howes ............... G06F 17/30864 715/205 |
| 2012/0078667 A1 | 3/2012 | Denker et al. |
| 2012/0092190 A1 | 4/2012 | Stefik et al. |
| 2012/0201362 A1 | 8/2012 | Crossan et al. |
| 2012/0262305 A1 | 10/2012 | Woodard et al. |
| 2012/0303390 A1 | 11/2012 | Brook et al. |
| 2012/0303753 A1 | 11/2012 | Hansen |
| 2012/0331058 A1 | 12/2012 | Huston et al. |
| 2013/0018810 A1 | 1/2013 | VonAllmen |
| 2013/0054375 A1 | 2/2013 | Sy et al. |
| 2013/0122936 A1 | 5/2013 | Hudson et al. |
| 2013/0124234 A1 | 5/2013 | Nilsson et al. |
| 2013/0126713 A1 | 5/2013 | Haas et al. |
| 2013/0141555 A1 | 6/2013 | Ganick et al. |
| 2013/0165086 A1 | 6/2013 | Doulton |
| 2013/0167290 A1 | 7/2013 | Ben |
| 2013/0185102 A1 | 7/2013 | Grossi |
| 2013/0227011 A1 | 8/2013 | Sharma et al. |
| 2013/0238370 A1 | 9/2013 | Wiseman et al. |
| 2013/0254234 A1 | 9/2013 | Pierce |
| 2013/0265174 A1 | 10/2013 | Scofield et al. |
| 2013/0279917 A1 | 10/2013 | Son et al. |
| 2013/0303192 A1 | 11/2013 | Louboutin |
| 2013/0304691 A1 | 11/2013 | Pinckney et al. |
| 2013/0317835 A1 | 11/2013 | Mathew |
| 2013/0324274 A1 | 12/2013 | Stites |
| 2013/0328917 A1 | 12/2013 | Zhou |
| 2013/0331087 A1 | 12/2013 | Shoemaker |
| 2013/0331118 A1 | 12/2013 | Chhabra |
| 2013/0331137 A1 | 12/2013 | Burchill |
| 2013/0332108 A1 | 12/2013 | Patel |
| 2013/0332156 A1 | 12/2013 | Tackin |
| 2013/0336662 A1 | 12/2013 | Murayama et al. |
| 2013/0343762 A1 | 12/2013 | Murayama et al. |
| 2014/0012918 A1 | 1/2014 | Chin et al. |
| 2014/0019172 A1 | 1/2014 | Oxenham et al. |
| 2014/0025235 A1 | 1/2014 | Levien et al. |
| 2014/0032250 A1 | 1/2014 | Oxenham et al. |
| 2014/0032377 A1 | 1/2014 | Oxenham et al. |
| 2014/0036088 A1 | 2/2014 | Gabriel |
| 2014/0046802 A1 | 2/2014 | Hosein et al. |
| 2014/0062773 A1 | 3/2014 | MacGougan |
| 2014/0065962 A1 | 3/2014 | Le |
| 2014/0071221 A1 | 3/2014 | Dave |
| 2014/0081882 A1 | 3/2014 | Govindaraman |
| 2014/0095219 A1 | 4/2014 | Zises |
| 2014/0095337 A1 | 4/2014 | Pigeon et al. |
| 2014/0105084 A1 | 4/2014 | Chhabra |
| 2014/0129629 A1 | 5/2014 | Savir et al. |
| 2014/0129962 A1 | 5/2014 | Lineberger et al. |
| 2014/0136196 A1* | 5/2014 | Wu ............... G10L 15/22 704/235 |
| 2014/0139380 A1 | 5/2014 | Ouyang |
| 2014/0141803 A1 | 5/2014 | Marti |
| 2014/0162628 A1 | 6/2014 | Bevelacqua |
| 2014/0167794 A1 | 6/2014 | Nath |
| 2014/0168170 A1 | 6/2014 | Lazarescu |
| 2014/0171114 A1 | 6/2014 | Marti |
| 2014/0176348 A1 | 6/2014 | Acker, Jr. et al. |
| 2014/0180820 A1 | 6/2014 | Louboutin |
| 2014/0189937 A1 | 7/2014 | Pietrzak et al. |
| 2014/0191979 A1 | 7/2014 | Tsudik |
| 2014/0200053 A1 | 7/2014 | Balasubramanian |
| 2014/0222335 A1 | 8/2014 | Piemonte |
| 2014/0222531 A1 | 8/2014 | Jacobs et al. |
| 2014/0232633 A1 | 8/2014 | Shultz |
| 2014/0232634 A1 | 8/2014 | Piemonte |
| 2014/0241730 A1 | 8/2014 | Jovicic et al. |
| 2014/0247279 A1 | 9/2014 | Nicholas |
| 2014/0247280 A1 | 9/2014 | Nicholas |
| 2014/0266804 A1 | 9/2014 | Asadpour |
| 2014/0269562 A1 | 9/2014 | Burchill |
| 2014/0274150 A1 | 9/2014 | Marti |
| 2014/0283135 A1 | 9/2014 | Shepherd |
| 2014/0293959 A1 | 10/2014 | Singh |
| 2014/0358545 A1 | 12/2014 | Robichaud et al. |
| 2014/0363168 A1 | 12/2014 | Walker |
| 2014/0364089 A1 | 12/2014 | Lienhart |
| 2014/0364148 A1 | 12/2014 | Block |
| 2014/0365120 A1 | 12/2014 | Vulcano |
| 2014/0375217 A1 | 12/2014 | Feri et al. |
| 2015/0006648 A1 | 1/2015 | Cao |
| 2015/0011242 A1 | 1/2015 | Nagaraj |
| 2015/0026623 A1 | 1/2015 | Horne |
| 2015/0031397 A1 | 1/2015 | Jouaux |
| 2015/0105035 A1 | 4/2015 | de Oliveira |
| 2015/0106085 A1 | 4/2015 | Lindahl |

(56) References Cited

U.S. PATENT DOCUMENTS

| | | | |
|---|---|---|---|
| 2015/0154513 | A1 | 6/2015 | Kennedy et al. |
| 2015/0170099 | A1 | 6/2015 | Beach-Drummond |
| 2015/0220940 | A1* | 8/2015 | Tuteja ............... G06Q 30/0201 705/7.29 |
| 2015/0242889 | A1 | 8/2015 | Zamer et al. |
| 2015/0347928 | A1 | 12/2015 | Boulanger et al. |
| 2015/0379478 | A1 | 12/2015 | Klemm et al. |

FOREIGN PATENT DOCUMENTS

| | | |
|---|---|---|
| WO | WO 00/51259 | 8/2000 |
| WO | WO 2009/104921 | 8/2009 |
| WO | WO 2013/051009 | 4/2013 |
| WO | WO 2013/089236 | 6/2013 |

OTHER PUBLICATIONS

U.S. Appl. No. 14/840,840 Office Action dated Jul. 1, 2016.
U.S. Appl. No. 14/798,201, John Cronin, Information Map Placement, filed Feb. 13, 2015.
U.S. Appl. No. 14/731,384, John Cronin, Wireless System for Social Media Management, filed Jun. 4, 2015.
U.S. Appl. No. 14/798,339, John Cronin, Social Media Connection for Venue Interactions, filed Jul. 13, 2015.
U.S. Appl. No. 14/840,840, John Cronin, Event Tailgating Community Management, filed Aug. 31, 2015.
U.S. Appl. No. 14/840,855, John Cronin, Event Tailgating Parking Management, filed Aug. 31, 2015.
U.S. Appl. No. 14/840,840 Final Office Action dated Dec. 29, 2016.
U.S. Appl. No. 14/798,201 Office Action dated Nov. 1, 2016.
U.S. Appl. No. 14/731,384 Final Office Action dated Nov. 25, 2016.
Chan, Casey; "NFL Helmets Are Finally Using Technology To Make Things Not Suck", Gizmodo, Aug. 22, 2012. http://Gizmodo.com/5937115/nfl-helmets-are-finally-using-technology-to-make-things-not-suck.
"Cisco Stadiumvision Mobile Solution", Cisco, Aug. 1, 2013.
"Create Innovative Services with Play Apps", Date of Download: Jan. 16, 2014 http://www.oledcomm.com/LIFI.html, Oledcomm—France LiFi.
Danakis, C et al.; "Using a CMOS Camera Sensor for Visible Light Communication"; 3rd IEEE Workshop on Optical Wireless Communications; [online], Dec. 3-7, 2012 [retrieved Aug. 14, 2015]. Retrieved from the Internet: <URL: https://195.134.65.236/IEEE Globecom 2012/papers/p1244-danakis.pdf> pp. 1244-1248.
Dawson, Keith; "LiFi in the Real World" All LED Lighting—Illuminating the LED Community, Jul. 31, 2013.
Gonzalez, Antonio; "NFL's helmet radios back on air", The Associated Press, telegram.com, Published Aug. 15, 2012.
Gorman, Michael; "Outstanding Technology brings visible light communication to phones and tablets via dongle and LEDs", Edgadget International Editions, Jul. 16, 2012.
Grebe, Helmut; "Coming soon: the "Twitter Helmet" (/2014/coming-soon-the-twitter-helmet)", All Twitter Blogs, Apr. 1, 2014.
Haas, Harald; "Delivering safe and secure wireless communications", pureLiFi. Date of download: Jan. 16, 2014 http://purelifi.co.uk/.
"How It Works", Ticketfly.com (http://start.ticketfly.com/platform/how-it-works/) Jan. 1, 2010.
"iPhone and Android Parking App", by ParkWhiz, Aug. 8, 2014.
Interactive Seat Map FAQs. Official Ticketmaster site. May 2, 2014. http://www.ticketm aster.com/interactiveseatm ap/faq.html.
Khan, Mehwish; "Mobilink Introduces Mobilink Voiler, a Voice-Based Social Networking Service", Propakistani Telecom and IT News, Dec. 20, 2013.
Kim, Torrey; "5 Free Apps That Help You Find Parking Discounts", Mobile Coupons & Deals Expert, About.com, Date of download: Aug. 1, 2014.

"KLM Meet & Seat", KLM.com, May 2, 2014. http://www.klm.com/travel/us en/prepare for trvel/on board/Your seat on board/meet and seat.htm.
Kumar, Navin; "Visible Light Communications Systems Conception and VIDAS", IETE Technical Review, vol. 25, Issue 6, Nov.-Dec. 2008. Date of download: Nov. 19, 2009 http://www.tr.ietejournals.org.
Levi's Stadium Mobile App, Aug. 21, 2014.
LiFi Overview—Green wireless mobile communication—LiFi Technology. Date of download: Jan. 16, 2014.
Li, Yang et al., "VICO: A Framework for Configuring Indoor Visible Light Communication Networks" Aug. 11, 2012, Mobile Adhoc and Sensor Systems (MASS), 2012 IEEE 9th International Conference, Las Vegas, NV.
McConky et al., Katie T.; "Automating Battlefield Event Reporting Using Conceptual Spaces and Fuzzy Logic for Passive Speech Interpretation", Military Communications Conference, 2009, MILCOM 2009. IEEE, Oct. 18-21, 2009.
"Minnesota Theater Offers 'Tweet Seats' to Smartphone Addicts", Huffington Post, Dec. 28, 2012.
Montero, Eric, "Design and Implementation of Color-Shift Keying for Visible Light Communications", Sep. 2013, McMaster University.
"New Tailgate Parking Available for 2014 O'Reilly Auto Parts Route 66 NHRA Nationals", Chicagoland Speedway, Apr. 14, 2014.
Nguyen et al., "A Novel like switching scheme using pre-scanning and RSS prediction in visible light communication networks", EURASIP Journal on Wireless Communications and Networking, 2013.
Ogasawara, Todd; "StartTalking: Free Android App for Handsfree Twitter, Facebook, & Text Messaging", SocialTimes, Sep. 30, 2010.
Ogawa; "Article about VLC Guidance developed", Visible Light Communications Consortium (VLCC), Aug. 31, 2012.
Ogawa; "iPhone app from CASIO", Visible Light Communications Consortium (VLCC), Apr. 26, 2012.
Ostrow, Adam; "Update Twitter and Your Facebook Status Using Voice", Mashable.com, Oct. 29, 2008.
Parekh, Rupal; "Is Voice-Based Bubbly the New Twitter?", Adage.com—Global News, Mar. 11, 2010.
"Pay-By-Phone Parking Meter App Expanding Citywide This Summer", CBS Chicago Local news, May 6, 2014.
Povey, Gordon, "VLC for Location, positioning and navigation", Jul. 27, 2011, http://visiblelightcomm.com/vlc-for-location-positioning-and-n . . . .
Rambabu et al., K.; "An Optimal Driving System by Using Wireless Helmet", International Journal of Science, Engineering and Technologies Research (IJSETR) vol. 2, Iss. 9, Sep. 2013. ISSN: 2278-7798.
Rosenthal, Gregg; "Report: Owners planning to have players miked-up", Around the League, NFL.com, Published Jul. 4, 2012.
Salter, Chuck; "TicketMaster Teams With Facebook So You Can Sit Next to Your Friends", Fast Company, Aug. 24, 2011.
"Seating chart software made with you in mind", Table Plan Software 1 Social Tables. Date of Download: May 2, 2014 https://socialtables.com/seating-chart-software.
"Social Seating and Booking Platform", SeatID. Date of Download: May 2, 2014 http://www.seatid.com/product/.
Sorgi, Jay; "NFL considers in-stadium audio with miked-up players, coaches", Todays TMJ4, Aug. 28, 2013.
"Speech-to-text server replace with product name advertising twitter tweet facebook social", Google Search Oct. 28, 2013.
"Sports Communications System", Telex Intercom, Feb. 22, 2010.
Stadium App 1 Levi's Stadium, Aug. 6, 2014.
Tailgate Scout Home page <http://tailgatescout.com/site> Date of download: Oct. 15, 2015.
Tailgate Scout Features page <http://tailgatescout.com/site/features/> Date of download: Oct. 15, 2015.
Tailgate Scout About page <http://tailgatescout.com/site/about/> Date of download: Oct. 15, 2015.
Thanigavel, M.; "Li-Fi Technology in Wireless Communication", International Journal of Engineering Research & Technology (IJERT), ISSN: 2278-0181, vol. 2 Issue 10, Oct. 2013.

(56) References Cited

OTHER PUBLICATIONS

Wang et al., Hongwei; "A Reservation-based Smart Parking System", The First International Workshop on Cyber-Physical Networking Systems, 2011.
Williams, George; "5 Easy Speech-to-Text Solutions", The Chronicle of Higher Education, ProfHacker, Teaching, Tech, and Productivity. Mar. 3, 2010.
Won, Eun Tae; "Visible Light Communication: Tutorial", Project: IEEE P802.15 Working Group for Wireless Personal Area Networks (WPANs), Mar. 9, 2008.
YouTube, "Twitter Helmet to Let User Tweet With Their Heads?", Anonymex, published on Apr. 17, 2014.
PCT Application No. PCT/US2015/033613 International Search Report and Written Opinion dated Sep. 1, 2015.
U.S. Appl. No. 14/788,754 Office Action dated Aug. 20, 2015.
U.S. Appl. No. 14/798,201 Final Office Action dated Jun. 1, 2016.
U.S. Appl. No. 14/798,201 Office Action dated Oct. 8, 2015.
U.S. Appl. No. 14/731,384 Office Action dated Apr. 29, 2016.
U.S. Appl. No. 14/798,339 Final Office Action dated Mar. 24, 2016.
U.S. Appl. No. 14/798,339 Office Action dated Sep. 4, 2015.
U.S. Appl. No. 14/840,840 Office Action dated Mar. 15, 2016.
U.S. Appl. No. 14/840,840 Office Action dated Oct. 30, 2015.
U.S. Appl. No. 14/840,855 Final Office Action dated Apr. 14, 2016.
U.S. Appl. No. 14/840,855 Office Action dated Oct. 27, 2015.
U.S. Appl. No. 14/798,201 Final Office Action dated Jun. 2, 2017.
U.S. Appl. No. 14/798,339 Office Action dated May 10, 2017.
U.S. Appl. No. 14/840,840 Office Action dated Jun. 23, 2017.
U.S. Appl. No. 14/840,855 Office Action dated Jul. 26, 2017.
U.S. Appl. No. 14/798,339 Final Office Action dated Oct. 13, 2017.
U.S. Appl. No. 14/840,840 Final Office Action dated Oct. 26, 2017.
U.S. Appl. No. 14/798,201 Office Action dated Jan. 8, 2018.

\* cited by examiner

SOCIAL NETWORK SYSTEM

CROSS-REFERENCE TO RELATED APPLICATIONS

This application is a continuation and claims the priority benefit of U.S. patent application Ser. No. 14/788,754 filed Jun. 30, 2015, which claims the priority benefit of U.S. provisional application No. 62/023,355, filed on Jul. 11, 2014, the disclosures of which are incorporated herein by reference.

BACKGROUND OF THE INVENTION

Field of the Invention

The present invention is generally related web publishing. More specifically, the present invention is related to modifying received audio speech data for automatic text publication on social media.

Description of the Related Art

Players, teams, and businesses currently use social media to increase their reach and communicate with fans to promote themselves, their views, products, and brands. Social media messages are commonly integrated into television broadcasts through commentary or displayed alongside live broadcasts in a portion of the display.

It is difficult, however, for athletes to send messages through social media during the course of a game because athletes do not have free use of their hands. An athlete cannot send, for example, a live comment regarding an event during the game because the athlete cannot leave the game to send a message through a phone. This limitation makes it difficult for players, teams, and businesses to fully leverage social media.

There is a need in the art for improved systems and methods for delivering real-time game commentary from players through social media.

SUMMARY OF THE PRESENTLY CLAIMED INVENTION

One exemplary method for sending social media messages describes receiving audio speech data through one or more microphones. The method also describes processing the audio speech data at a processing unit. The processing unit converts the audio speech data to text speech data. The method also describes comparing the text speech data to one or more databases. The one or more databases include one or more code words. The method also describes sending the processed speech data for output through social media. The processing unit routes text speech data for output through social media according to code words included in the text speech data.

One exemplary system for sending social media messages provides one or more microphones, a processing unit, and a processor. The one or more microphones receive audio speech data through one or more microphones. The processing unit processes the audio speech data and compares the text speech data to one or more databases. The processing unit converts the audio speech data to text speech data. The one or more databases include one or more code words. Execution of instructions stored in the memory by the processor performs a set of operations. The operations include sending the processed speech data for output through a social media interface. The processing unit routes text speech data for output through the social media interface according to code words included in the text speech data.

One exemplary non-transitory computer-readable storage medium is also described, the non-transitory computer-readable storage medium having embodied thereon a program executable by a processor to perform an exemplary method for sending social media messages. The exemplary program method describes receiving audio speech data. The program method also describes processing the audio speech data. The program method also describes converting the audio speech data to text speech data. The program method also describes comparing the text speech data to one or more databases. The one or more databases include one or more code words. The program method also describes sending the processed speech data for output through social media. The processing unit routes text speech data for output through social media according to code words included in the text speech data.

DETAILED DESCRIPTION

The present invention includes systems and methods for sending social media messages without the need for keyboard inputs. A microphone captures live audio speech data and transmits the audio data to a processing unit. The processing unit converts the audio to speech data. The processing unit also removes censored words, emphasizes key words, and edits that data to include product and promotional messages where appropriate. The processing unit then uses code words contained in the speech data to send the speech data to the appropriate social media outlets for output.

Social messages can be sent from entertainment or cultural events that are presented at a theatre, gymnasium, stadium, or other facility to a group of people. Such events include a wide variety of sporting events such as football (American and Global), baseball, basketball, soccer, ice hockey, lacrosse, rugby, cricket, tennis, track and field, golf, cycling, motor sports such as automobile or motorcycle racing, horse racing, Olympic games, and the like; cultural events such as concerts, music festivals, plays, the opera, and the like; religious events; and more permanent exhibitions such as museum, historic home, and the like.

Figure 1:
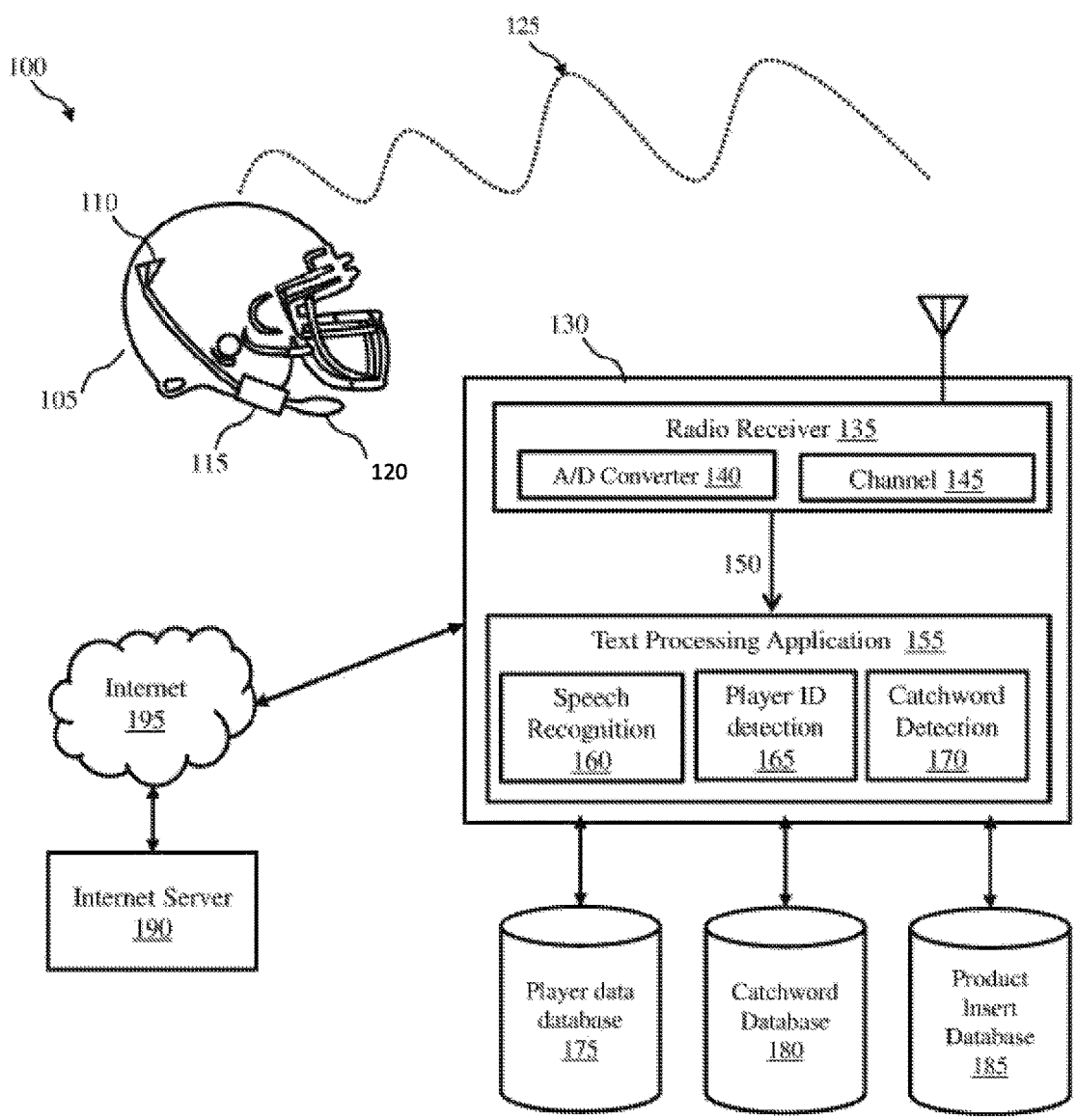
FIG. 1 illustrates a system for sending social media messages.

FIG. 1 illustrates a system 100 for sending social media messages. The system 100 includes a wearable item 105, a processing unit 130, the Internet 195, an internet server 190, and three databases 175, 180, and 185. As illustrated in FIG. 1, a microphone 120, radio transmitter 115, and an antenna 110 are connected to the helmet 105. The processing unit includes a radio receiver 135 and a text processing application 155. The radio receiver 135 includes an analog-to-digital converter 140 and a means for receiving one or more channels 145. The text processing application 155 includes a speech recognition unit 160, a player identification detection unit 165, and a catchword detection unit 170. The three databases 175, 180, and 185 include code words (not shown).

The microphones 120 can be acoustic-to-electric transducers for converting audio data into an electrical signal. The microphones 120 can be used with a wireless transmitter. The microphones can be wearable. The radio transmitter 115 is in communication with the microphone 120. The wearable items 105 can be sporting equipment used in the course of playing a sport, including protective equipment or non-protective equipment. The wearable items 105 can include helmets, protective padding, uniforms, jerseys, footwear, eyewear (e.g. glasses, face shields), or balls (e.g. football, baseball, soccer ball).

The processing unit 130 is in communication with the radio transmitter 115 through the antenna 110, wherein the radio transmitter 115 produces a radio transmission 125 for delivery to the processing unit 130. The processing unit 130 can be a personal computer, a desktop computer, or a server. The radio transmission 125 is a radio frequency signal carrying audio data. The radio transmitter 115 converts an electrical signal from the microphone 120 into a radio signal for transmission to the antenna 110. The radio transmitter 115 can be a one-way radio transmitter. The radio transmitters 115 can include at least one power source, a radio oscillator, a signal modulator, and a radio frequency amplifier. The radio transmitter 115 can be wireless or wearable. The antenna 110 can convert an electrical signal into radio waves for transmitting a radio-frequency audio signal. The processing unit is in communication with the server 190 through the Internet 195. The system 100 can automatically publish digital speech data to a website through the Internet 195. The server 190 is connected to the Internet 195 and hosts one or more remotely accessible web pages. The server can publish content received via the Internet 195 to social media websites such as Twitter or Facebook. The digital speech data can be representative of verbal commentary during a sporting event.

The radio receiver sends a digital audio signal 150 to the text processing application 155. The analog-to-digital converter 140 converts analog radio signal to digital audio signal. The radio receiver 135 receives radio transmissions 125 through one or more channels 145. The radio receiver 135 is a radio frequency receiver for receiving the radio transmission 125 from the radio transmitter 115. The one or more channels 145 are data parameters defining the channel through which the radio receiver 135 receives the radio transmission 125. The data parameters control or change the frequency monitored by the radio receiver 135. The one or more channels 145 are identified with a speaker, such as an athlete.

The speech recognition unit 160 includes a software program for translating spoken words to text. The speech recognition unit 160 may be an automatic speech recognition program. The speech recognition unit 160 converts the digital audio signal into text. The player identification detection unit 165 is a software program for determining the identity of a sports player by the channel associated to each of the one or more athletes. The catchword detection unit 170 is a software program for recognizing code words in the speech recognition unit output, wherein code words include catchwords and product words. The catchword detection unit modifies the speech recognition unit output.

The player data database 175, the catchword database 180, and the product insert database 185 may be relational databases such as Microsoft Access or Microsoft SQL Server or flat files, such as comma-separated value text files, where the flat files are compatible with applications such as Microsoft Office applications. The player data database 175 is a database of player speech data produced by the text processing application 155. The player data database 175 is a relational database with one or more data tables. Each of the one or more player data database data tables contains the speech recognition unit output and metadata associated with the speech recognition unit output. The catchword database 180 is a database of catchwords provided to the catchword detection unit 170. Each of the one or more catchword database data tables contains catchwords used to modify the text data. The product insert database 185 is a database of product words and sponsored words, wherein the sponsored words are associated with product words and the sponsored words are used to replace associated product words in the text data.

Figure 2:
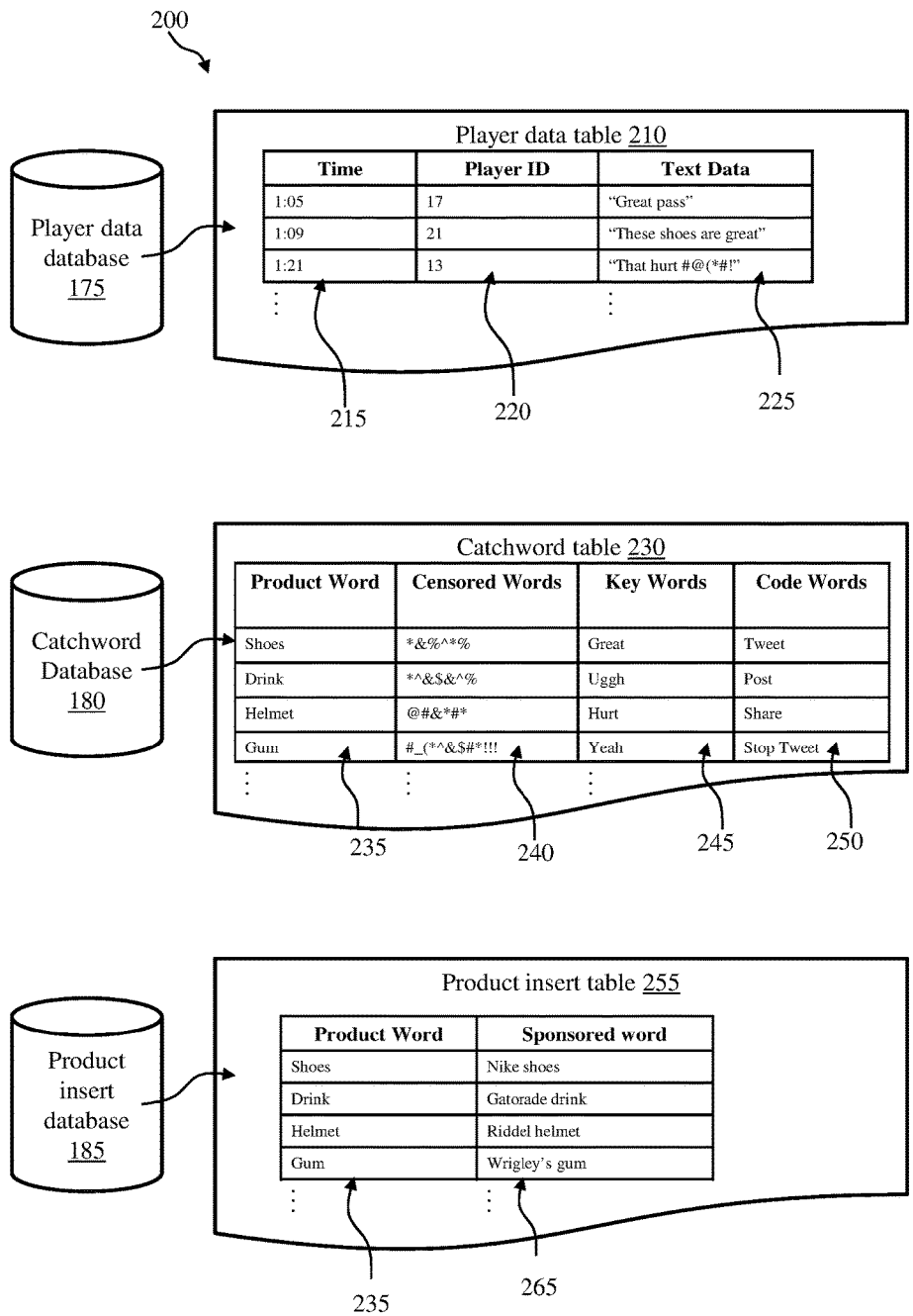
FIG. 2 illustrates database tables in a player data database, a catchword database, and a product insert database.

FIG. 2 illustrates database tables 200 in the player data database 175, the catchword database 180, and the product insert database 185. The processing unit 130 uses the player data database data table 210 to organize text speech data. The player data database table 210 organizes text data 225 according to time 215 and player identification 220. The timestamp for each text data record corresponds to when the system 100 created the text data record. Player identification 220 provides the identity of the speaker associated with the text data record. The player identification 220 can be the name of the sports player, the jersey number of the sports player, the channel identification associated with the speaker, or the frequency associated with the speaker. The speech recognition unit 160 outputs the text data 225.

The processing unit uses the catchword database 180 to modify text speech data. The catchword database table 230 includes product words 235, censor words 240, key words 245, and code words 250. The processing unit modifies the text speech data to remove censor words 240 listed in the database. Censor words 240 include obscene language and content prohibited by government agencies (such as the Federal Communications Commission). The processing unit modifies the text speech data to replace product words 235 with corresponding sponsored words 265 listed in the product insert table 255. Product words 235 include specific products, words associated with specific brands, or words associated with specific products. The processing unit further modifies the text speech data to emphasize key words 245 listed in the database. Key words include interjections and words that convey excitement. The processing unit routes modified speech data for output through social media according to code words 250 listed in the database. Code words 250 include words associated with posting messages to particular social media forums, as well as words indicating the beginning and end of messages.

The processing unit uses the product insert database 185 to modify text speech data. The product insert database table 255 includes product words 235 and sponsor words 265. The processing unit modifies the text speech data to replace product words 235 listed in the database with sponsored words 265 listed in the database. Product words 235 include specific products, words associated with specific brands, or words associated with specific products. Sponsored words 265 include words associated with advertising, endorsements, or promotional deals, as well as words for specific brands or marketing campaigns.

Figure 3:
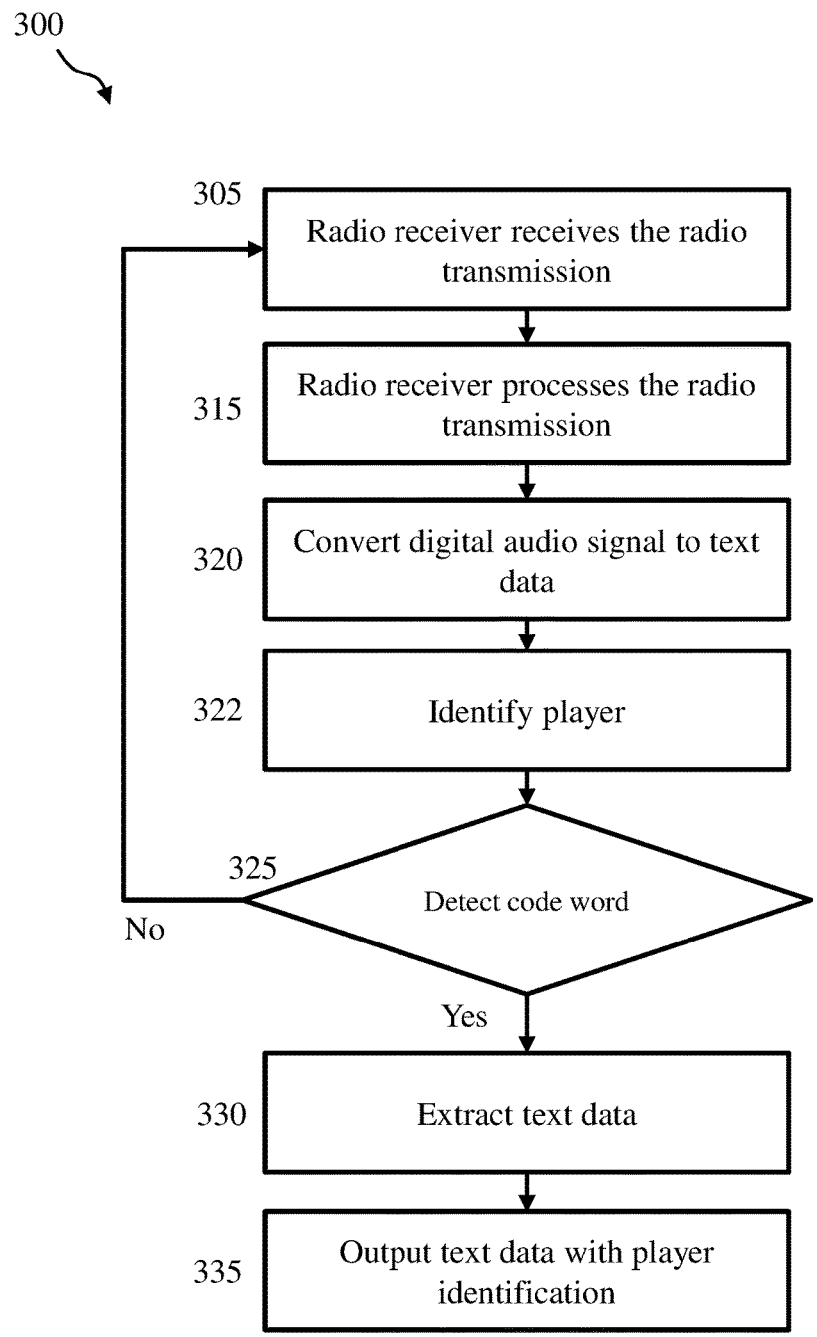
FIG. 3 illustrates a method for processing speech data.

FIG. 3 illustrates a method 300 for processing speech data. The method begins at block 305, where the radio receiver 135 receives the radio transmission 125. The radio receiver 135 may receive radio transmissions 125 through multiple channels, and wherein the channels may be predefined and changed. At block 315, the radio receiver processes the radio transmission 125 using the analog-to-digital converter 140 to convert the radio transmission 125 into digital audio signal. At block 320, the text processing application 155 uses the speech recognition unit 160 to convert the digital audio signal to text data. The text processing application 155 may use a standard input/output stream. At block 310, the text processing application 155 uses the digital audio signal 150 and channel 145 information to identify the player. The player identification unit 165 then associates the text data with a player based on player information associated with the channel. The player identification unit 165 can compare the frequency of the digital audio signal with information regarding each player and the channel associated with each player. The text processing application 155 stores the text data produced by the speech recognition unit 160, player identity data produced by the player identification detection unit 165, and the current time in the player data database 175. At block 325, the text processing application 155 uses the catchword detection unit 170 to examine the text data for words stored in the catchword database 180 and product insert database 185 and process the text data according to the detected words. The method goes back to block 305 if the text data does not include code words used to route the text data for output through social media. If the text data includes one or more code words used to route the text data for output through social media, the method moves to block 330. The text processing application 155 can use a loop construct to compare each word of the text data to the code words 250. At block 330, the text processing application 155 extracts the text data for output. The text processing application 155 can select a series of words for extraction based on the code word used and the location of the code word. The text processing application 155 can select a series of words or characters starting with a code word 250 and a ending with code word 250. The text processing application can also select a series of words or characters between a first occurrence of a code word 250 and a second occurrence of a code word 250 in the text data. At block 335, the text processing application outputs the text data together with the player identification for publication through social media.

Figure 4:
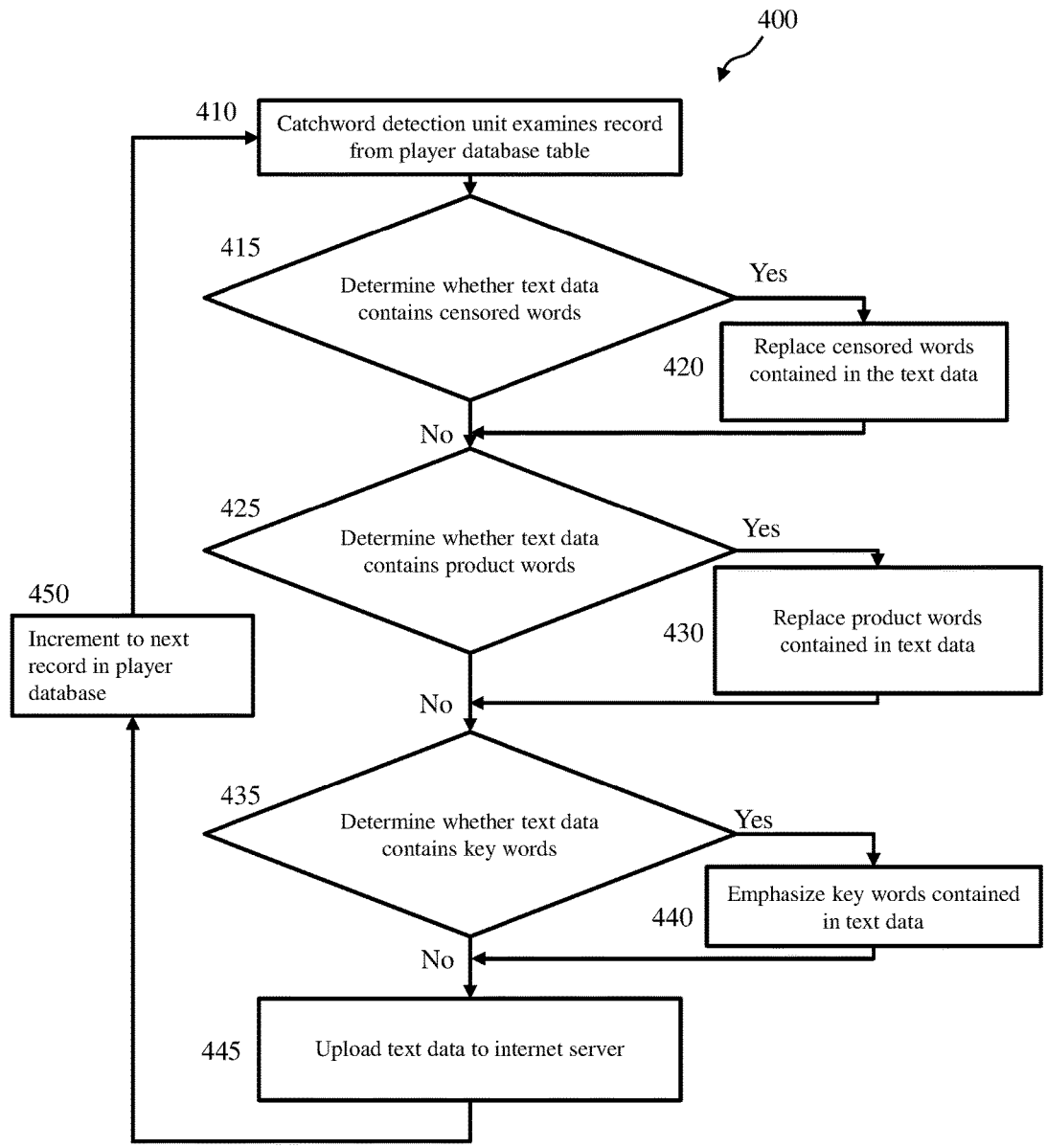
FIG. 4 illustrates a method for processing text data.

FIG. 4 illustrates a method 400 for processing text data. The method begins at block 410, where catchword detection unit 170 examines a record from the player database table 210.

At block 415, the catchword detection unit determines whether the text data contains censored words 240 listed in the catchword database table 230. The catchword detection unit can compare each word in the record with each censored word 240 listed in the catchword database table 230.

If the text data does not contain censored words 240, the method continues to block 408. If the text data contains censored words 240 listed in the catchword database table 230, the method continues to block 420. At block 420, censored words contained in the text data are replaced with redacted text or a placeholder. The method then continues to block 425.

At block 425, the catchword detection unit determines whether the text data contains product words 235 listed in the catchword database table 230. The catchword detection unit can compare each word in the record with each product word 235 listed in the catchword database table 230.

If the text data does not contain product words 235, the method continues to block 435. If the text data contains product words 235 listed in the catchword database table 230, the method continues to block 430. At block 430, product words contained in the text data are replaced with sponsored words listed in the product insert table 255. The method then continues to block 435.

At block 435, the catchword detection unit determines whether the text data contains key words 245 listed in the catchword database table 230. The catchword detection unit can compare each word in the record with each key word 245 listed in the catchword database table 230.

If the text data does not contain key words 245, the method continues to block 445. If the text data contains key words 245 listed in the catchword database table 230, the method continues to block 440. At block 440, key words contained in the text data are emphasized in the text data. The text processing application may insert markup language formatting commands before and after each key word to emphasize the key word. The method then continues to block 445.

At block 445, the processing unit 130 uploads the text data to the internet server 190 via the Internet 195. The processing unit 130 can upload the text data using a content submission application programming interface (API) provided by an operator of the internet server 190 to allow for direct publishing to a social media website. At block 450, the catchword detection unit increments to the next record in the player database table 210 and repeats the method, beginning again at block 304.

While various embodiments have been described above, it should be understood that they have been presented by way of example only, and not limitation. The present descriptions are not intended to limit the scope of the presently claimed invention or to limit the scope of embodiments of the presently claimed invention. The present descriptions are intended to cover alternatives, modifications, and equivalents consistent with the spirit and scope of the disclosure.

What is claimed is:

1. A method for publishing audio speech as text social media messages using code words, the method comprising:
   receiving audio signals from a plurality of wearable devices worn by a plurality of users each speaking a plurality of code words, wherein the wearable device includes:
      a microphone that captures the code words spoken by the user as audio signals, and
      a radio transmitter that transmits the audio signals to a processing unit that includes a radio receiver, wherein the transmitted audio signals are assigned to different radio transmission channels each having data parameters that control a frequency monitored by the radio receiver, and wherein each channel is assigned to a different user;
   executing instructions stored in memory by a processor of the processing unit, the instructions executed to:
      identify the user associated with the received audio signal based on the radio transmission channel used to transmit the received audio signal,
      convert the received audio signal into a digital record comprising corresponding text data, wherein the text data record is assigned a unique timestamp, and
      identify that the digital text data record assigned the unique timestamp includes the plurality of code words based on matching to text stored within a database associated with the identified user, wherein the plurality of code words identified within the text data record assigned the unique timestamp includes:

a first matching code word that marks a beginning of a social media message to be published within the converted text of the text data record, a second matching code word that marks an end of the social media message to be published within the converted text of the text data record, and a third matching code word that authorizes publication of a portion of the text data record defined by the first and the second matching code word as a social media message via a corresponding social media server tied to the third matching code word; and generating a social media message to be published on the corresponding social media server based on the identification of the third code word within the converted text data record, wherein the message includes the portion of the converted text data record associated with the first and the second code word, and wherein the generated social media message is associated with the identified user.

2. The method of claim 1, further comprising:

comparing the portion of the digital text data record associated with the first and the second code word with one or more databases that includes special terms; and modifying the portion of the digital text data record based on the comparison.

3. The method of claim 2, wherein the special terms include specific words to be censored from the social media message.

4. The method of claim 3, wherein modification of the converted text data record that includes one or more censored words is performed by redacting the converted text data record.

5. The method of claim 3, wherein modification of the converted text data record that includes one or more censored words is performed by replacing the censored words with a placeholder.

6. The method of claim 2, wherein the special terms include specific key words to be emphasized in the social media message.

7. The method of claim 6, wherein the emphasis of the specific key words in the social media message is provided via markup language formatting commands.

8. The method of claim 2, wherein the special terms include sponsored terms associated with a particular product or promotional message to be included in the social media message.

9. The method of claim 1, wherein identification of the user associated with the received audio includes comparing the received audio against a database that includes information about a plurality of different users.

10. A system for publishing audio speech as text social media messages using code words, the system comprising:

a wearable device worn by a user that includes:

a microphone that captures audio signals based on the user speaking a plurality of code words, and a radio transmitter that transmits the received audio signals to a processing unit that includes a radio receiver, wherein the transmitted audio signals are assigned to different radio transmission channels each having data parameters that control a frequency monitored by the radio receiver, and wherein each channel is assigned to a different user;

a processing unit that includes instructions stored in memory, the instructions executed by the processor to:

identify the user associated with the received audio signal based on the radio transmission channel used to transmit the received audio signal, convert the received audio signal into a digital record comprising corresponding text data, wherein the text data record is assigned a unique timestamp, and identify that the digital text data record assigned the unique timestamp includes the plurality of code words based on matching to text stored within a database associated with the identified user, wherein the plurality of code words identified within the text data record assigned the unique timestamp includes:

a first matching code word that marks a beginning of a social media message to be published within the converted text of the text data record, a second matching code word that marks an end of the social media message to be published within the converted text of the text data record, and a third matching code word that authorizes publication of a portion of the text data record defined by the first and the second matching code word as a social media message via a corresponding social media server tied to the third matching code word; and a communication interface that generates a social media message to be published on the corresponding social media server based on the identification of the third code word within the converted text data record, wherein the message includes the portion of the converted text data record associated with the first and the second code word, and wherein the generated social media message is associated with the identified user.

11. The system of claim 10, wherein the processor further:

compares the portion of the digital text data record associated with the first and the second code word with one or more databases that includes special terms; and modifies the portion of the digital text data record based on the comparison.

12. The system of claim 11, wherein the special terms include specific words to be censored from the social media message.

13. The system of claim 12, wherein modification of the converted text data record that includes one or more censored words is performed by redacting the converted text data record.

14. The system of claim 12, wherein modification of the converted text data record that includes one or more censored words is performed by replacing the censored words with a placeholder.

15. The system of claim 11, wherein the special terms include specific key words to be emphasized in the social media message.

16. The system of claim 15, wherein the emphasis of the specific key words in the social media message is provided via markup language formatting commands.

17. The system of claim 11, wherein the special terms include sponsored terms associated with a particular product or promotional message to be included in the social media message.

18. The system of claim 10, wherein identification of the user associated with the received audio includes comparing the received audio against a database that includes information about a plurality of different users.

* * * * *